C. L. Spencer,

Clutch

No. 1,546. Reissued Sept. 29, 1863.

Witnesses:
G. Reed
L. Brown

Inventor:
C. L. Spencer
Daniel Bread
Atty

UNITED STATES PATENT OFFICE.

CHARLES L. SPENCER, OF NEW YORK, N. Y

IMPROVEMENT IN CONVERTING MOTION.

Specification forming part of Letters Patent No. 34,597, dated March 4, 1863; Reissue No. 1,546, dated September 29, 1863.

*To all whom it may concern:*

Be it known that I, CHARLES L. SPENCER, of New York, of the county and State of New York, have invented a new and useful Improvement in the Devices for Converting a Reciprocating Motion into a Continuous Rotary Motion; and I do declare that the following is a full description of the same, reference being had to the accompanying drawings, and to the letters of reference marked thereon.

Figure 1:
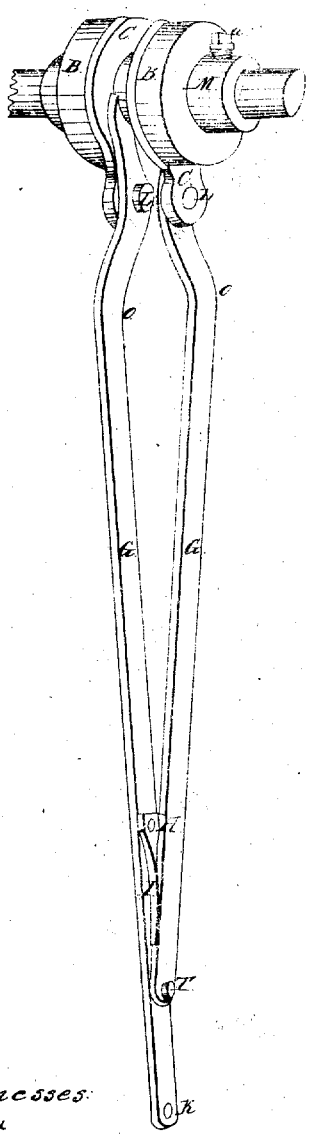
Figure 2:
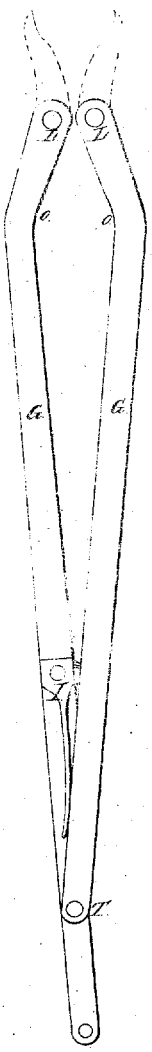
Figure 3:
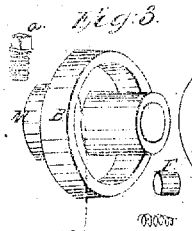
Figure 4:
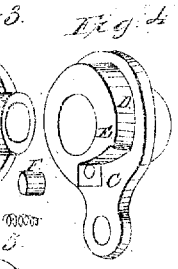
Figure 6:
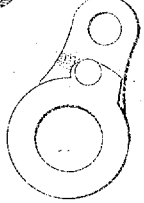
Figure 7:
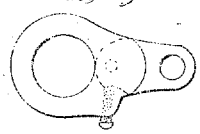
Figure 7:
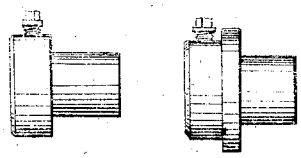
Figure 8:
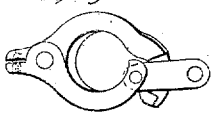

Figure 1 is a perspective view of the whole arrangement. Fig. 2 is a view of my improved double connecting-bar. Figs. 3 and 4 are perspective views of one of the devices which I use as a substitute for the well-known crank. Figs. 6, 7, and 8 are parts to be referred to hereinafter.

My improvement relates to that class of inventions whose object is to supersede the well-known crank worked by a connecting-bar and treadle, and is of use in those instances where it is desired to obtain a rotary motion in one direction only. While the ordinary crank worked by the treadle may present little difficulty to a person accustomed to its use, it is not easily controlled by one not accustomed thus to its use. In the employment of sewing-machines, for example, operated in this way quite as great annoyances are experienced by those who only occasionally use them from turning the driving-shaft in the wrong direction and from the necessity of observing that the crank is in the right position at starting, as from any other cause. It is, besides, often desirable to run the machine very slowly when commencing to sew certain kinds of work, and this, with the crank-motion, cannot be readily done by an inexperienced person. In all the arrangements of devices to be substituted for the crank with which I am acquainted the above-mentioned difficulties have been avoided only by the sacrifice of speed, for while it is often advantageous to start the machine slowly, it is equally desirable that it should be capable of running as rapidly as if worked by the crank.

To devise a substitute for the crank-and-treadle motion which shall not be liable to the objections named, and yet shall produce as high a rate of speed, is the object of my invention.

Figure 5:
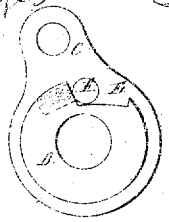

In the accompanying drawings, A, Fig. 1, is a fragment of the shaft of the machine to be driven. Upon this shaft I place, at a convenient distance apart, (say, one-half inch,) and arranged to work in opposite directions, two common pawl and ratchet-wheels, or, instead thereof, two friction-pawls, constructed as follows:

I cast a cup-shaped piece of metal, as shown at B, Fig. 3, provided with a hub, M, made to fit the shaft A, to which it may be secured by a set-screw, *a*, in any desired position on the shaft. I then make a disk of metal in the form shown at Figs. 4 and 5, upon the inner surface of which is the raised projection D, the periphery of the raised portion D being scored out in the form of a curved incline, as shown at E. The disk C and cup B are then fitted to each other, the raised portion D being inclosed by the flange of the cup and capable of being turned easily within it. The two, when fitted together, present the appearance shown in Fig. 1, the disk C being free to revolve around the shaft A. I now place a small roller, F, in the deepest part of that portion of D which is cut away, the diameter of the roller being such that when the disk is turned on the shaft A in one direction it will present no obstruction; but if turned in the opposite direction it will be carried farther along the inclined plane E, and consequently bind the disk C to the cup B, whereby any motion given to the disk-plate C will be imparted to the shaft to which the cup B is secured.

Figs. 6, 7, and 8 are views of similar devices involving the same principle, but which need not be described more minutely, as they are not claimed in this patent, all being, so far as the effect is concerned, the equivalents of the ordinary pawl-and-ratchet motion, to which my invention is equally applicable, the former, however, being preferred on account of being accompanied by less noise in operation.

In order to work the friction-pawls which I have described, as well as to work the ordinary pawls and ratchets, if the latter be used instead of the former, I use a double connecting-rod, G G, one leg of which, at its upper extremity, is connected by a wrist-pin to the disk-plate L of one friction-pawl, and the other leg is similarly connected to the disk-plate L′ of the other friction-pawl. The two legs are connected toward their lower extremity at J by a pin. A treadle is pivoted as it would be to an ordinary shackle-bar. Near the upper extremity of each connecting-rod a curve is made as shown at *o o*, in order that the rods, when at the extremity of their upward throw, may embrace the shaft A, and thereby obtain a greater range of motion than could possibly be secured if they were not so curved. At any convenient place above the point where the two rods are united I place a spring, I, the tendency of which is to spread the rods apart, and consequently assist in preventing the two sets of pawls from remaining on a dead-center when the two are set on the shaft nearly together; and I also place between the two rods a spring-buffer, H, which subserves the same purpose as the spring, and also prevents the disagreeable click from the rods striking together when the machine is worked rapidly.

It will be seen that by the use of the curved connecting-rods G G and the spring I, or its equivalent, the same effect can be produced upon the shaft for every upward and downward motion of the treadle as can be obtained from the common crank. By the use of the curved rods the shaft can be completely spanned, while the spring I, by its elasticity, spreads the rods apart and prevents the two sets of operating pawls and ratchets, or their substitutes, from resting upon the dead-centers. Thus all the capacity for speed which the crank possesses is retained, while at the same time the advantage is secured of being able to impart a slow, positive movement to the shaft at all times and in one direction only.

I do not claim making the upper extremities of a pair of connecting-rods curved so as to embrace the driving-shaft; but What I do claim, and desire to secure by Letters Patent of the United States, is—

The use of the spring I, or its equivalent, in combination with the curved connecting-rods G G, for the purpose of enabling the operating-pawls to be so adjusted as to obtain an effect upon the shaft equal to the action of the crank, while the danger of hanging upon the dead-point is prevented, substantially as described.

CHAS. L. SPENCER.

Witnesses.

EDWIN T. COREY,

EDWARD B. PEET.